United States Patent
Tulkki (10) Patent No.: US 12,044,438 B2
(45) Date of Patent: Jul. 23, 2024

(54) AIR PURIFYING DEVICE, ARRANGEMENT AND METHOD FOR SEPARATING MATERIALS FROM A GAS FLOW

(71) Applicant: Genano Oy, Vantaa (FI)

(72) Inventor: Juhani Tulkki, Vantaa (FI)

(73) Assignee: Genano Oy, Espoo (FI)

( * ) Notice: Subject to any disclaimer, the term of this patent is extended or adjusted under 35 U.S.C. 154(b) by 128 days.

(21) Appl. No.: 17/202,805

(22) Filed: Mar. 16, 2021

(65) Prior Publication Data

US 2021/0356148 A1     Nov. 18, 2021

(30) Foreign Application Priority Data

May 15, 2020   (FI) ..................... 20205494

(51) Int. Cl.
| | | |
|---|---|---|
| *B03C 3/38* | (2006.01) | |
| *B03C 3/017* | (2006.01) | |
| *B03C 3/41* | (2006.01) | |
| *F24F 8/158* | (2021.01) | |

(Continued)

(52) U.S. Cl.
CPC .............. *F24F 8/194* (2021.01); *F24F 8/158* (2021.01); *F24F 8/167* (2021.01)

(58) Field of Classification Search
CPC ... A61L 9/22; F24F 8/194; F24F 8/158; F24F 8/167; F24F 3/16; B03C 2201/06; B03C 2201/10; B03C 3/08; B03C 3/12; B03C 3/47; B03C 3/41; B03C 3/04; B03C 3/43;

(Continued)

(56) References Cited

U.S. PATENT DOCUMENTS 1,344,330 A * 6/1920 Bradley ................... B03C 3/47
                                                        96/64
5,456,741 A * 10/1995 Takahara ............... B03C 3/155
                                                        96/57

(Continued)

FOREIGN PATENT DOCUMENTS

CN      203899745 U     10/2014
CN      204051912 U     12/2014

(Continued)

OTHER PUBLICATIONS

L. Dascalescu, A. Samuila, D. Rafiroiu, A. Iuga and R. Morar, "Multiple-needle corona electrodes for electrostatic processes application," in IEEE Transactions on Industry Applications, vol. 35, No. 3, pp. 543-548, May-Jun. 1999, doi: 10.1109/28.766999. (Year: 1999).*

*Primary Examiner* — Christopher P Jones
*Assistant Examiner* — Sonji Turner
(74) *Attorney, Agent, or Firm* — Laine IP Oy (57) ABSTRACT

According to an example aspect of the present invention, there is provided an air purifying device comprising a grounded honeycomb structure having a plurality of hexagonal openings, wherein the honeycomb structure is supported by a frame, a plurality of ionization needles arranged downstream of the honeycomb structure, wherein each needle is coaxially aligned with a respective center axis of an opening of the honeycomb structure, and a plurality of collector plates arranged downstream of the needles, and wherein the device is configured to generate ionization corona discharge by positive ionization voltage led to the needles.

13 Claims, 6 Drawing Sheets

(51) Int. Cl.
*F24F 8/167* (2021.01)
*F24F 8/192* (2021.01)

(58) Field of Classification Search
CPC .. B03C 3/017; B03C 3/38; B03C 3/51; B01D 46/00; B01D 46/2418; B01D 53/74
See application file for complete search history.

(56) References Cited

U.S. PATENT DOCUMENTS

| | | | | |
|---|---|---|---|---|
| 6,330,146 | B1* | 12/2001 | Blitshteyn | H05F 3/04 361/220 |
| 7,332,019 | B2* | 2/2008 | Bias | B03C 3/72 96/26 |
| 7,517,394 | B2* | 4/2009 | Bologa | B03C 3/09 96/99 |
| 7,638,104 | B2* | 12/2009 | Taylor | B03C 3/49 422/186.04 |
| 7,695,552 | B2* | 4/2010 | Sato | H01T 23/00 96/97 |
| 7,909,918 | B2* | 3/2011 | Bias | B03C 3/86 96/81 |
| 2005/0126392 | A1* | 6/2005 | Wascher | B03C 3/16 95/65 |
| 2005/0160907 | A1 | 7/2005 | Zhang et al. | |
| 2006/0207428 | A1 | 9/2006 | Ibe et al. | |
| 2008/0034973 | A1* | 2/2008 | Griffiths | B03C 3/08 96/57 |
| 2010/0037776 | A1* | 2/2010 | Chan | B03C 3/08 96/80 |
| 2010/0282083 | A1* | 11/2010 | Edwards | B03C 3/155 55/482 |
| 2011/0171094 | A1* | 7/2011 | Zahedi | F24F 8/192 422/186.07 |
| 2013/0216440 | A1* | 8/2013 | Brueck | F01N 3/01 96/62 |
| 2015/0071842 | A1 | 3/2015 | Zahedi | |
| 2016/0030949 | A1 | 2/2016 | Jameson et al. | |
| 2017/0304770 | A1 | 10/2017 | Cheng et al. | |

FOREIGN PATENT DOCUMENTS

| | | | | |
|---|---|---|---|---|
| CN | 104437865 | A | 3/2015 | |
| CN | 204276154 | U | 4/2015 | |
| CN | 204503330 | U | 7/2015 | |
| CN | 105698293 | A | 6/2016 | |
| CN | 106861340 | A | 6/2017 | |
| CN | 206868437 | U | 1/2018 | |
| CN | 103949343 | B | 5/2018 | |
| CN | 108339666 | A | 7/2018 | |
| CN | 109855200 | A | 6/2019 | |
| EP | 1291086 | A2 | 3/2003 | |
| EP | 1988740 | B1 | 9/2016 | |
| EP | 3552710 | A1 * | 10/2019 | B03C 3/06 |
| EP | 3517208 | B1 * | 3/2022 | B03C 3/08 |
| GB | 968982 | A | 9/1964 | |
| JP | S54145871 | U | 10/1979 | |
| JP | S61187254 | U | 11/1986 | |
| JP | 2007533445 | A | 11/2007 | |
| JP | 2009297651 | A * | 12/2009 | B03C 33/41 |
| JP | 5343243 | | 11/2013 | |
| JP | 6071291 | A | 2/2017 | |
| JP | 6071291 | B2 | 2/2017 | |
| RU | 2393022 | C1 | 6/2010 | |
| RU | 2509610 | C2 | 3/2014 | |
| RU | 155104 | U1 | 9/2015 | |
| RU | 2586336 | C1 | 6/2016 | |
| RU | 2742696 | C1 | 2/2021 | |
| SU | 965521 | A1 | 10/1982 | |
| SU | 1008830 | A1 | 3/1983 | |
| WO | WO2018090990 | A1 | 5/2018 | |

\* cited by examiner

AIR PURIFYING DEVICE, ARRANGEMENT AND METHOD FOR SEPARATING MATERIALS FROM A GAS FLOW

FIELD

The present invention relates to an air purifying device.

Further, the present invention relates to an arrangement comprising an air purifying device and a flow channel.

Additionally, the present invention relates to a method for separating materials from a gas flow.

BACKGROUND

Different devices and methods for separating materials from a gas flow are known, for example, document WO 2018/090990 A1 discloses an electric field device. The electrostatic precipitator comprises a hollow dust collecting pole. The dust collecting pole is grounded and typically in the form of at least one cylindrical body. The device may comprise a plurality of cylindrical bodies forming an array. The device further comprises at least one corona rod fixed on a bracket, connected to a power source and being arranged within the at least one cylindrical body. The at least one corona rod is arranged on a central axis of the at least one cylindrical body. The bracket may be on both sides of the at least one cylindrical body or on one side. The bracket may be a conductive metal bracket, a metal-plated plastic bracket or a non-conductive bracket.

Documents CN 105698293 A and CN 106861340 A both describe an air purifying device. The devices are directed to reducing ozone generation. The devices each comprise a metal plate with openings. Thin, tapered needles are arranged in the center of the tunnel plane of the metal plate.

In view of the foregoing, it would be beneficial to provide an electrostatic precipitator or air purifying device.

SUMMARY OF THE INVENTION

The invention is defined by the features of the independent claims. Some specific embodiments are defined in the dependent claims.

According to an aspect of the present invention, there is provided an air purifying device. The device comprises a grounded honeycomb structure having a plurality of hexagonal openings, wherein the honeycomb structure is supported by a frame, a plurality of ionization needles or ionization elements arranged downstream of the honeycomb structure, wherein at least some of the needles or ionization elements are coaxially aligned with a respective center axis of an opening of the honeycomb structure, and a plurality of collector plates arranged downstream of the plurality of ionization needles, and wherein the device is configured to generate ionization corona discharge by positive ionization voltage led to the needles.

Various embodiments of the first aspect may comprise at least one feature from the following bulleted list:
- the device is configured such that corona discharge spreads from tips of the needles to the honeycomb structure
- the needles are attached to PCB rails
- the needles are partially over-molded by plastic structures
- the PCB rails are embedded in plastic structures
- each plastic structure is in the form of an aerodynamic profile
- a cross-section of each plastic structure is in the form of a NACA profile
- the material of the needles is wolfram, graphite, graphene, a noble metallic material or an inert material
- the needles are made of a material that is able to withstand a continuous corona generated oxidation and reduction of material
- the device is configured to be inserted into a flow channel
- the device is an electrostatic precipitator
- tips of the needles are arranged 5 mm to 25 mm downstream of the honeycomb structure, for example spaced apart 10 mm to 15 mm from the honeycomb structure
- each of the needles is coaxially aligned with a respective center axis of an opening of the honeycomb structure
- the device comprises a DC power source
- the device does not comprise any additional filter or filter system According to a second aspect of the present invention, there is provided an arrangement comprising an air purifier in accordance with any one of claims 1-13 and a flow channel.

According to a third aspect of the present invention, there is provided a method for separating materials from an air flow, the method comprising providing a grounded honeycomb structure in a flow channel, wherein the honeycomb structure is supported by a frame, providing a plurality of ionization needles arranged downstream of the honeycomb structure, wherein at least some of the needles are coaxially aligned with a respective center axis of an opening of the honeycomb structure, generating ionization corona discharge by positive ionization voltage led to the needles arranged downstream of the honeycomb structure, and collecting the materials by collector plates comprising collection surfaces arranged downstream of the needles.

Considerable advantages are obtained by means of certain embodiments of the present invention. An air purifying device for separating materials in the form of particles or drops from a gas flow is provided.

The device meets the following technically advanced characteristic:
- particle ionization with positive polarization voltage
- a structure for low aerodynamic drag of the ionization panel
- a flat mechanical structure in order to limit the required space in flow channels or air channels
- a robust structure for harsh environment and moving platforms
- a structure for easy and quick manufacture
- simple production testing methods can be applied with clear pass/fail criteria The ionization panel is part of the ElectroStatic Precipitator (ESP) technology air purification technology. Together with an ESP collector module the ionization panel provides easy maintenance, is washable, and provides a low air drag method of air purification. The technology is able of running with very little energy consumption and provides also the possibility to save energy in air ventilation, where a fan is typically used for overcoming fibre filter air drag. The structure of the device is scalable for different sizes, modular for maintenance and cleaning, and allows robotic assembly lines. Positive ionization voltage decreases the ozone ($O_3$) generation of the ionization process and enables the possibility to leave the active carbon filter out of the ESP module The following performance requirements can be achieved according to certain embodiments of the present invention:
- air volume capacity in the range between 1200 and 1400 $m^3/h$, or more
- front surface area in the range between 0.3 and 0.4 $m^2$ airflow speed in the range between 1.0 and 2.5 m/s, or more single pass air purification efficiency>99% for 0.3 µm particles (for complete unit with collector)

module is easily purged for cleaning and replacing needles all components and structures allow low pressurized (<100 Pa) water cleaning

EMBODIMENTS

Figure 1:
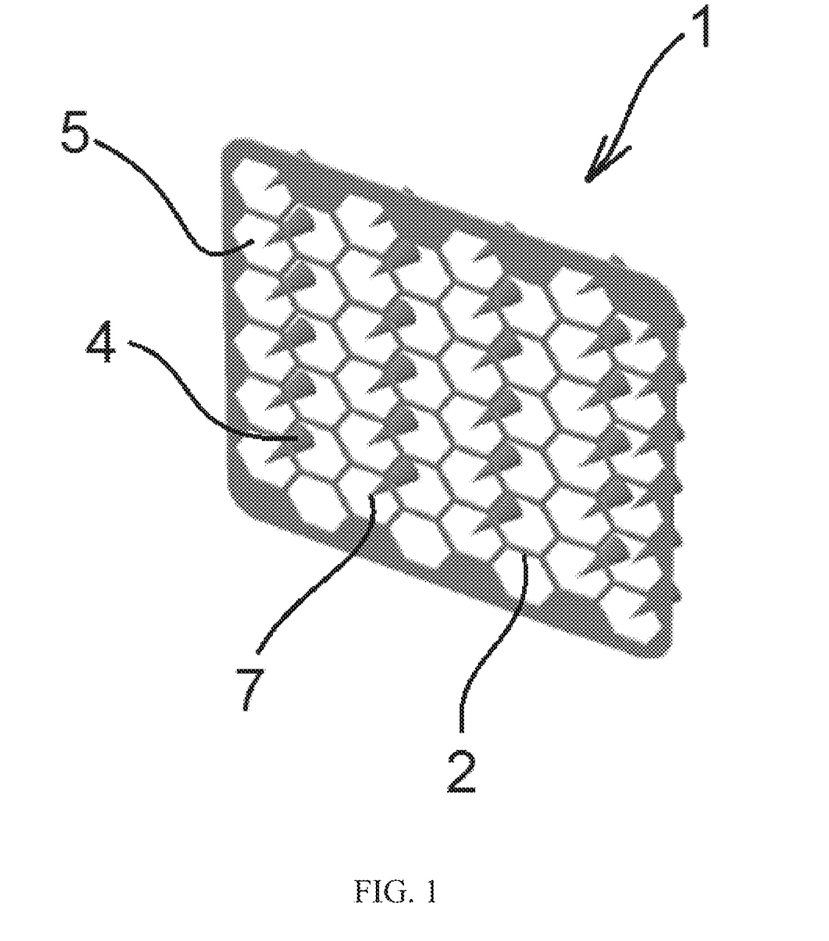
FIG. 1 illustrates a schematic perspective view of an air purifier in accordance with at least some embodiments of the present invention.

In FIG. 1 a schematic perspective view of an air purifier 1 in accordance with at least some embodiments of the present invention is illustrated. The air purifying device 1 comprises a grounded honeycomb structure 2. The honeycomb structure 2 is supported by a frame as e.g. shown in FIG. 3. In other words, a frame structure supports the ionization panel.

The honeycomb structure 2 comprises a plurality of hexagonal openings 5, for instance. The honeycomb structure 2 is made of a relatively thin substrate, for example having a thickness between 0.5 millimeters and a few centimeters, for example 1 mm to 10 mm. Air to be purified is guided towards the honeycomb structure 2 along a flow channel (not shown) in which the air purifying device 1 is arranged and then passes through the openings 5 of the honeycomb structure 2. The gas flow to be purified may include materials in the form of particles and/or drops. The honeycomb structure 2 may be a laser cut, honeycomb punctured RST metallic ground plate attached to the frame 3. The electrically grounded honeycomb structure 2 serves as a first electrode. The honeycomb structure 2 is important for providing equal shapes and full coverage of ionizing corona discharge. The honeycomb structure also minimizes the pressure drop across the ionization panel as it resists the air flow as little as possible. The honeycomb structure 2 is highly energy efficient as it represents least air drag, in particular in comparison to rectangular or circular openings.

Figure 2:
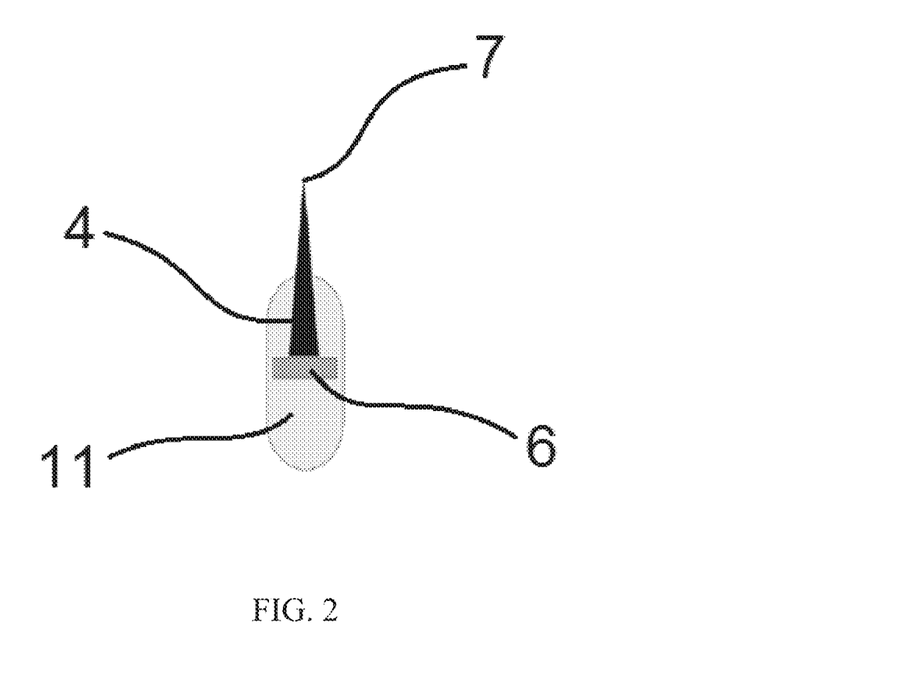
FIG. 2 illustrates a schematic view of a needle of an air purifier in accordance with at least some embodiments of the present invention.

A plurality of ionization elements, for example ionization needles 4, is further arranged downstream of the honeycomb structure 2. The plurality of needles 4 serves as a second electrode constituting an ionizer that cooperates with the first electrode. At least some of the needles, typically each needle 4, is/are coaxially aligned with a respective center axis of an opening 5 of the honeycomb structure 2. In other words, the number of needles is typically identical to the number of openings 5 of the honeycomb structure 2. A center axis of an opening 5 of the honeycomb structure 2 is typically parallel to a direction of the gas flow. The needles 4 are typically attached to a PCB rail arranged downstream of the tips of the needles 4 as shown in FIG. 2. The needle tips 7 are typically arranged 10 mm to 25 mm, for example 15 mm, downstream of the honeycomb ground plate in order to create a corona flow that is covering each opening 5 of the honeycomb structure 2. The ionization corona discharge is generated by positive ionization voltage led to the set of sharp needles 4 arranged downstream of the honeycomb structure 2. Positive ionization voltage decreases the ozone ($O_3$) generation of the ionization process and enables the possibility to leave the active carbon filter out of the ESP module. The second electrode is typically energized at a high voltage of several thousand volts by a DC power supply, typically in the range between 5 kV to 20 kV, preferably 10 kV to 15 kV. The voltage may be adjustable, for instance. A corona ionization stream is formed on each tip of a needle 4 and then directed to the circumference of the corresponding opening 5 in the honeycomb structure 2. The particulate and laden air stream passes through these ionization zones.

Figure 4:
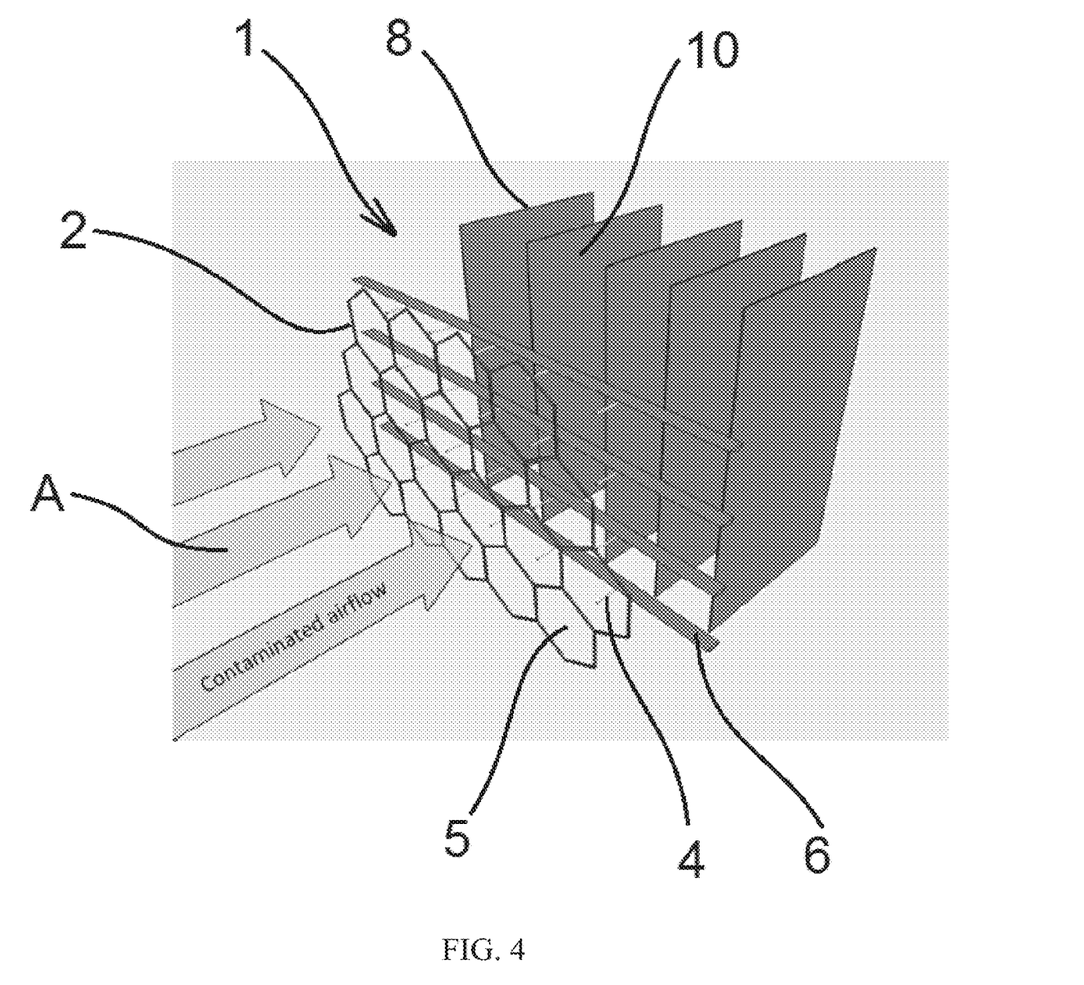
FIG. 4 illustrates a schematic perspective view of another air purifier in accordance with at least some embodiments of the present invention.

Finally, the air stream is guided to collector plates 8 as described and shown in connection with FIG. 4.

In FIG. 2 a schematic view of a needle 4 of an air purifier 1 in accordance with at least some embodiments of the present invention is illustrated. As shown, the needle 4 is attached to a support structure 6, for example a PCB rail. The PCB rail may be, for example, about 5 mm to 7 mm wide and aligns the needle 4 with a respective opening 5 of the honeycomb structure 2 shown in FIG. 1. Thus, high tension can be directed to the ion yield tip 7 of the needle 4. In other words, the ionization discharge current is generated with a positive voltage, thus limiting ozone generation to a minimum. The voltage is typically supplied to the needle 4 through copper foils of the circuit board.

The needle 4 may be partially over-molded by a plastic structure 11 and the PCB rail 6 may be embedded in said plastic structure 11. The plastic structure 11 may be in the form of an aerodynamic profile in order to reduce resistance and creation of noise. The aerodynamic profile may be, for example, in the form of a NACA profile or have a rounded leading and/or trailing edge. In particular, the combination of a honeycomb structure having hexagonal openings and PCB rails embedded in plastic structures 11 in the form of aerodynamic profiles provides beneficial properties. The material of the needle 4 is graphite, graphene, a noble metallic material or an inert material, for instance. In other words, the needle 4 is made of a material that is able to withstand a continuous corona generated oxidation and reduction of material.

Figure 3:
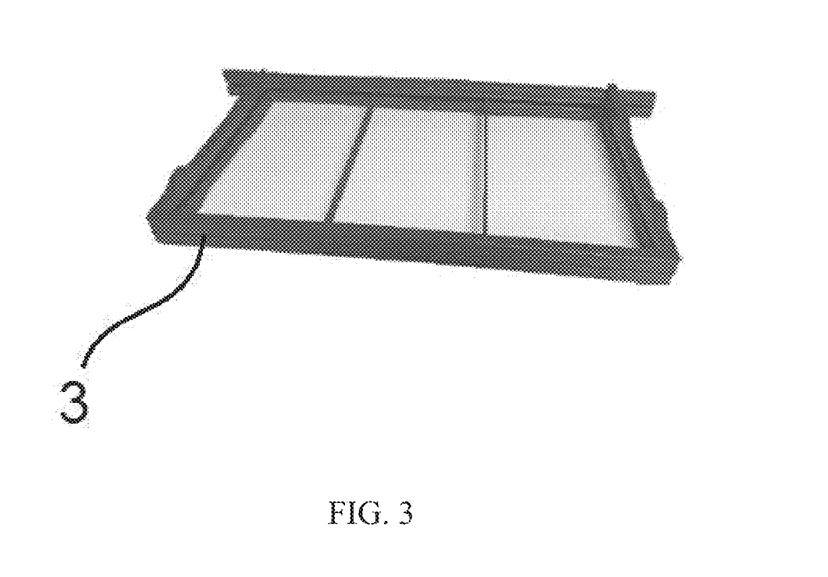
FIG. 3 illustrates a schematic view of a frame of an air purifier in accordance with at least some embodiments of the present invention.

In FIG. 3 a schematic view of a frame 3 of an air purifier in accordance with at least some embodiments of the present invention is illustrated. The frame 3 may be, for example, made of plastic material. A plastic frame provides high reproducibility of dimensions when being manufactured. The plastic material is typically selected to withstand high ionization voltage and to minimize leakage currents. The frame 5 may be rectangular, circular, elliptical or polygonal, for instance. The shape of the frame 3 typically corresponds with an inner shape of a flow channel (not shown).

According to certain embodiments, the frame 3 is designed to support both the ionization part (honeycomb structure 2 and rails 6 with needles 4) and the collector plates 8. The collector plates 8 are aligned with the ionized airflow and their dimensions depend on the speed of the airflow A.

In FIG. 4 a schematic perspective view of another air purifier 1 in accordance with at least some embodiments of the present invention is illustrated. As can be seen, a contaminated air flow is guided through the honeycomb structure 2. Subsequently, ionization corona discharge is generated by positive ionization voltage led to the needles 4 arranged downstream of the honeycomb structure 2. The needles 4 are coupled to PCB rails 6 arranged parallel to each other and face towards the honeycomb structure 2. The PCB rails 6 may be oriented in vertical or horizontal direction, for instance. However, the needles 4 may also be coupled to a grid-like support structure comprising the PCB rails 6 in order to increase stability. Finally, particles and/or drops are collected by the collector plates 8 comprising collector surfaces 10 arranged downstream of the needles 4. The collector plates 8 are typically ESP type collector plates. The collector plates 8 are arranged parallel or substantially parallel to each other. The distance between adjacent collector plates 8 may be in the range between 3 mm to 10 mm, for example, 5 mm. The number of collector plates 8 may be e.g. in the range between 25 to 50, for example 40. The collector plates 8 are further arranged perpendicular or substantially perpendicular to a plane formed by the grounded honeycomb structure 2. Material previously contained in the contaminated airflow can be easily removed from the collector surfaces 10 of the collector plates 8, for example by washing the plates 8 with water.

Every second collector plate 8 is typically grounded and the remaining collector plates are energized at a high voltage of several thousand volts by a DC power supply, typically in the range between 2 kV to 8 kV, for example 5 kV. The voltage may be adjustable, for instance.

Figure 5:
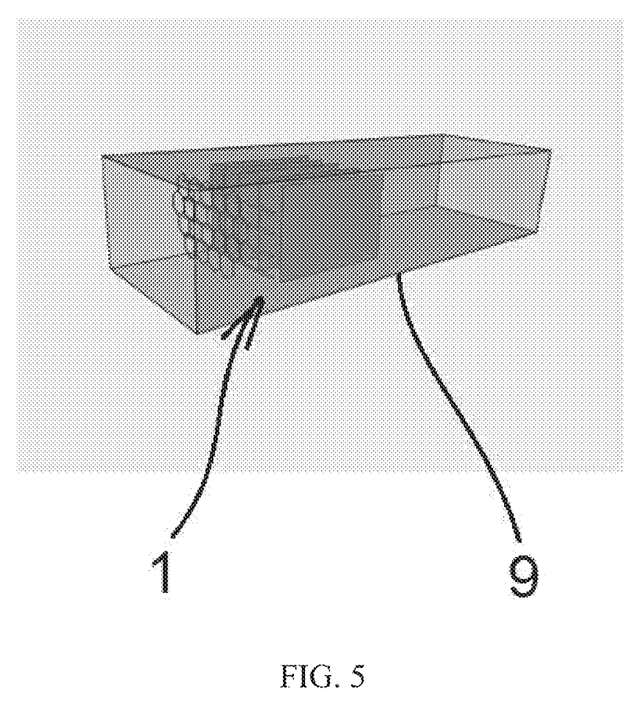
FIG. 5 illustrates an arrangement in accordance with at least some embodiments of the present invention.

In FIG. 5 an arrangement in accordance with at least some embodiments of the present invention is illustrated. As can be seen, an air purifier 1 as described above is arranged within a rectangular flow channel 9. According to certain other embodiments, the flow channel 9 may also be circular or elliptical, for instance.

Figure 6:
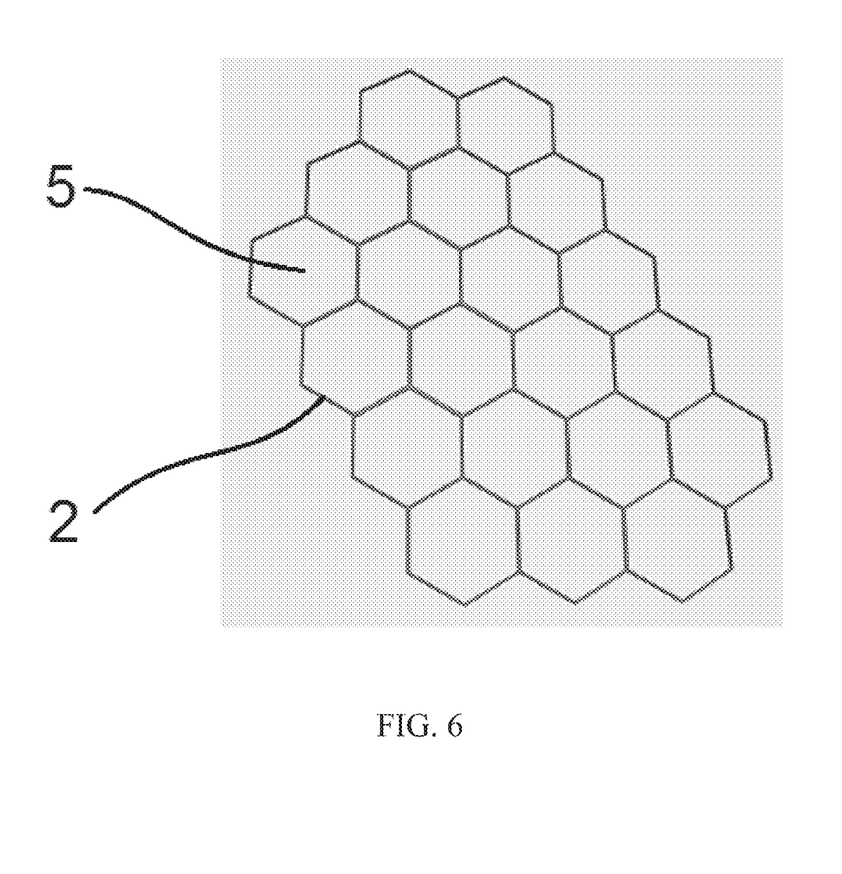
FIG. 6 illustrates a honeycomb structure of an air purifier in accordance with at least some embodiments of the present invention.

In FIG. 6 a honeycomb structure 2 of an air purifier 1 in accordance with at least some embodiments of the present invention is illustrated. As can be seen, a plurality of hexagonal openings 5 is provided in the honeycomb structure 2. The honeycomb structure 2 comprises an array of hollow openings 5 formed between very thin walls, thus forming a first grounded electrode, providing a high area through which contaminated air can pass, allowing guiding of the contaminated air flow towards the needles 4, reducing drag and allowing reduction of weight.

Figure 7:
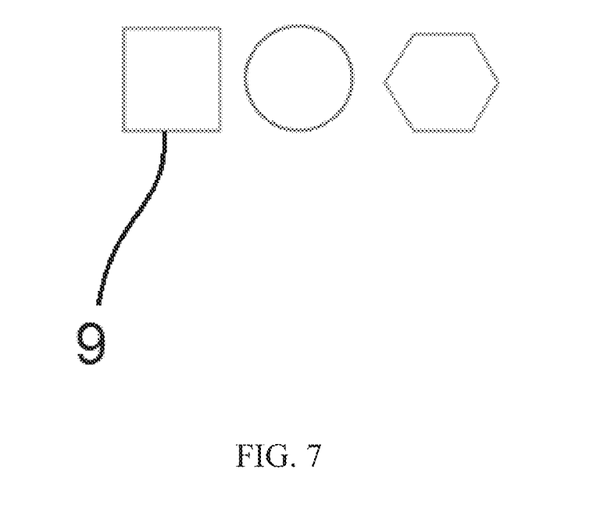
FIG. 7 illustrates different flow channels of an arrangement in accordance with at least some embodiments of the present invention.

In FIG. 7 different flow channels 9 of an arrangement in accordance with at least some embodiments of the present invention are illustrated. The flow channels 9 may have any size and shape, for example a rectangular, circular or hexagonal cross-section.

Figure 8:
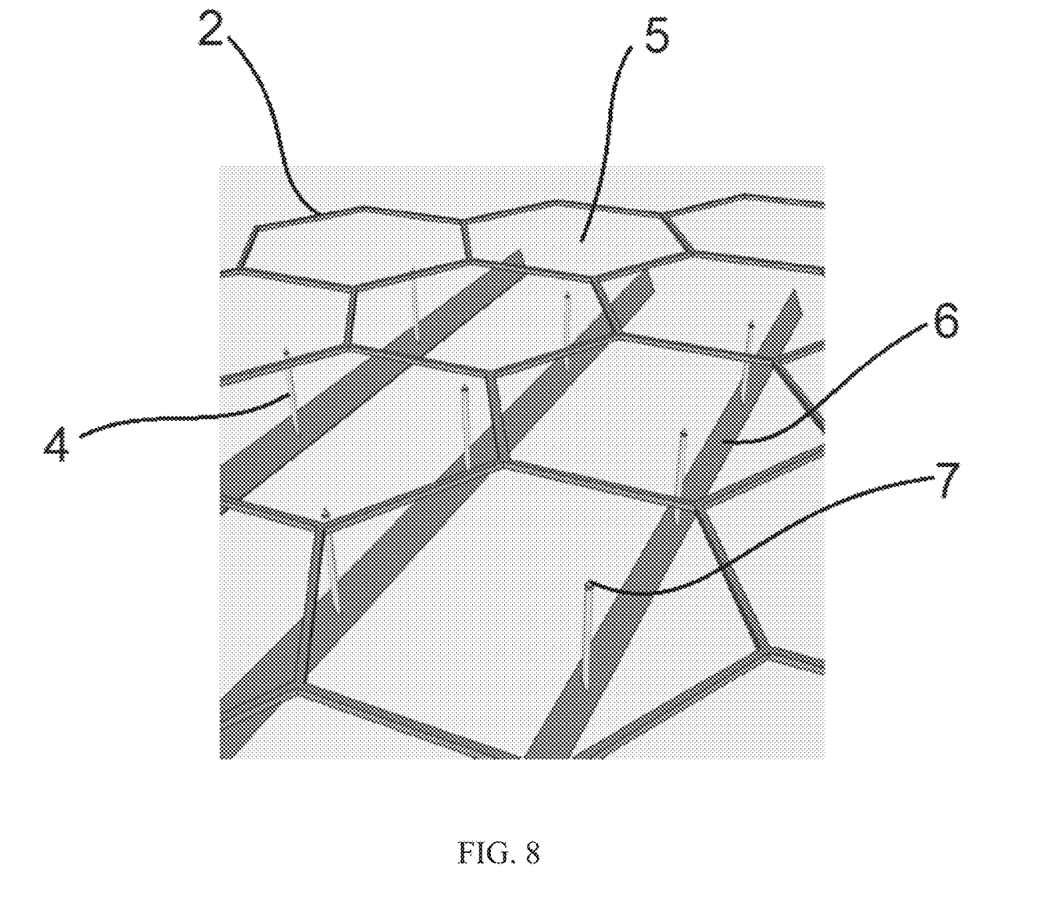
FIG. 8 illustrates details of an air purifier in accordance with at least some embodiments of the present invention.

FIG. 8 illustrates details of an air purifier 1 in accordance with at least some embodiments of the present invention. The needles 4 are mounted on rails 6 downstream of the honeycomb ground plate 2. Each needle 4 is aligned with a centre of a honeycomb hexagon. The corona discharge spreads from the needle tips 7 to the honeycomb structure 2. The corona discharge covers the entire airflow facing area. The rails 6 are aerodynamically shaped and provide firm structure for the needles 4. The high ionization voltage provided by a voltage source (not shown) is supplied to the needles 4 through copper foils inside the rail material, for instance.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in air purifiers and/or purifying air.

Very suitable uses being particularly flow channels, for example in hospitals, isolation rooms, operating rooms, factories manufacturing microchips as well as air intakes and/or air outlets.

REFERENCE SIGNS LIST 1 air purifying device
2 honeycomb structure
3 frame
4 needle
5 opening
6 support structure
7 tip of needle
8 collector plate
9 flow channel
10 collector surface
11 plastic structure
A airflow

CITATION LIST

Patent Literature
 WO 2018/090990 A1
 CN 105698293 A
 CN 106861340 A
Non Patent Literature

The invention claimed is:

1. An air purifying device comprising:
 a grounded honeycomb structure having a plurality of hexagonal openings, wherein the honeycomb structure is supported by a frame,
 a plurality of ionization needles arranged downstream of the honeycomb structure, wherein each of the needles is coaxially aligned with a respective center axis of a hexagonal opening of the honeycomb structure, wherein tips of the needles are arranged 5 mm to 25 mm downstream of the honeycomb structure, wherein the needles are attached to PCB rails and partially over-molded by plastic structures, wherein the PCB rails are embedded in the plastic structures, wherein the plastic structures are each in a form of an aerodynamic profile, and
 a plurality of collector plates arranged downstream of the plurality of ionization needles,
 and wherein the device is configured to generate ionization corona discharge by positive ionization voltage led to the needles.

2. The air purifying device according to claim 1, wherein the device does not comprise any additional filter or filter system.

3. The air purifying device according to claim 1, wherein the device is configured such that corona discharge spreads from tips of the needles to the honeycomb structure.

4. The air purifying device according to claim 1, wherein the material of the needles is wolfram, graphite, graphene, a noble metallic material or an inert material.

5. The air purifying device according to claim 1, wherein the needles are made of a material that is able to withstand a continuous corona generated oxidation and reduction of material.

6. The air purifying device according to claim 1, wherein the device is configured to be inserted into a flow channel.

7. The air purifying device according to claim 1, wherein the device is an electrostatic precipitator.

8. The air purifying device according to claim 1, wherein the device is attachable to a flow channel.

9. A method for separating materials from an air flow, the method comprising:
 providing a grounded honeycomb structure having a plurality of hexagonal openings in a flow channel, wherein the honeycomb structure is supported by a frame,
 providing a plurality of ionization needles arranged downstream of the honeycomb structure, wherein each of the needles is coaxially aligned with a respective center axis of an opening of the honeycomb structure, wherein tips of the needles are arranged 5 mm to 25 mm downstream of the honeycomb structure, wherein the needles are attached to PCB rails and partially over-molded by plastic structures, wherein the PCB rails are embedded in the plastic structures, wherein the plastic structures are each in a form of an aerodynamic profile,
 generating ionization corona discharge by positive ionization voltage led to the needles arranged downstream of the honeycomb structure, and
 collecting the materials by collector plates comprising collection surfaces arranged downstream of the needles.

10. The air purifying device according to claim 1, wherein the aerodynamic profile has a rounded leading and/or trailing edge.

11. The method according to claim 9, wherein the aerodynamic profile has a rounded leading and/or trailing edge.

12. The air purifying device according to claim 1, wherein each collector plate is arranged perpendicular or substantially perpendicular to the honeycomb structure in a vertical plane.

13. The method according to claim 9, the method further comprising arranging each collector plate perpendicular or substantially perpendicular to the honeycomb structure in a vertical plane.

* * * * *